Patented June 24, 1930

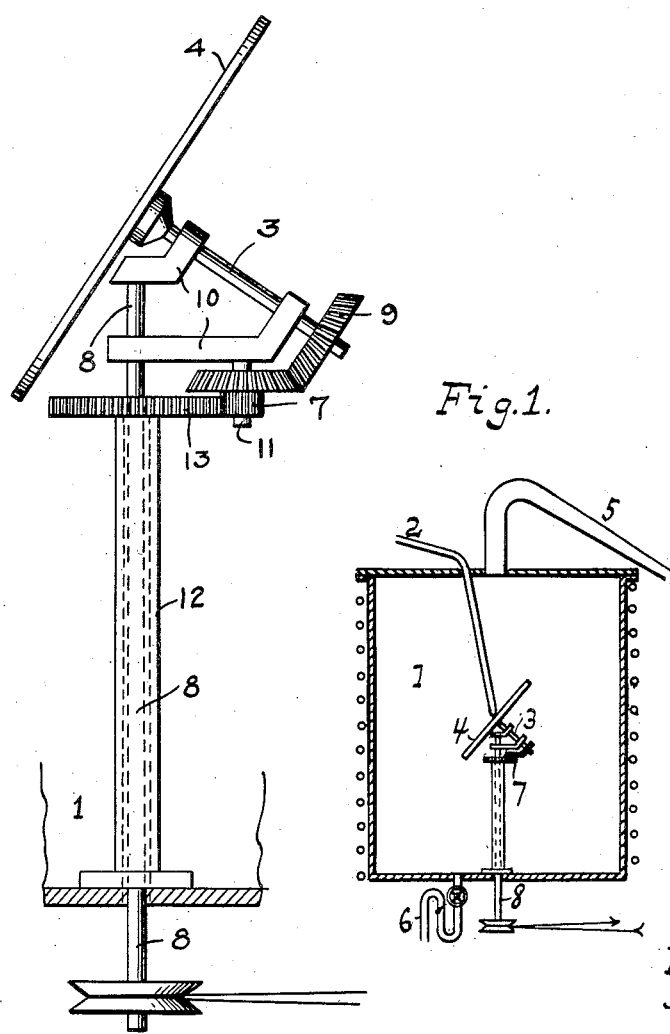

1,766,699

UNITED STATES PATENT OFFICE

HANS ADOLF von STADEN AND ALBERT BERENBRUCH, OF NEUROSSEN, AND ANTON HÖHN, OF LEUNA-OCKENDORF, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

APPARATUS FOR CONTINUOUS DISTILLATION OF DIFFICULTLY-DISTILLABLE LIQUIDS

Application filed September 28, 1927, Serial No. 222,576, and in Germany September 11, 1926.

Many liquids and solutions are very difficult to evaporate or distil, by reason of their physical properties, inasmuch as, in some cases, retarded ebullition, bumping or frothing over when heated occurs, whilst in other cases their colloidal structure is a source of difficulty. Substances which have such physical properties are, for example, tars especially crude tars, many oils, saline solutions, colloidal suspensions, and the like, and, for the most part, these cannot be distilled at all unless subjected to some preliminary treatment.

In practice, it is attempted to overcome these difficulties by distributing the substance, in some cases after it has been dehydrated as completely as possible, in a very thin layer on shallow pans and exposing it to the action of heat, or by increasing the superficial area of the substance to the utmost possible degree by spraying, as for example through nozzles. These methods, however, are troublesome, entail the use of large or cumbrous, and therefore costly, apparatus, and do not enable the operation to be carried out on a continuous scale, even in the case of spraying, as many substances choke up the spraying nozzles after a short time. In some processes, such for example as those for drying milk or dehydrating oils, it has been proposed to employ a revolving disc, which has an atomizing effect, the heat required for the evaporation being introduced into the apparatus by means of a counterflow of hot gases or air passed through the atomized material. In this case, a more or less extensive apparatus is required for warming the gases, and, moreover, in many instances it is undesirable that the gaseous distillation products should be brought into contact with other gases whereby their condensation may be retarded or their nature or composition modified We have now found a very simple process for the continuous evaporation, distillation or separation of difficultly distillable liquids which consists in causing the liquid to be evaporated, to be sprayed, by means of a disc rapidly rotating around two axes forming an angle with each other, against the heated walls of a still, so that the liquid is sprayed against the whole heated walls of the still and is evaporated thereon more or less instantaneously.

Our invention will further be illustrated with reference to Figures 1 and 2 of the accompanying drawings of which Figure 1 represents a vertical section through the distilling vessel and Figure 2 shows the means for rotating the disc more in detail. The liquid to be distilled is admitted into the still 1 of cylindrical form, through the pipe 2, which discharges it on to the centre of the disc 4. The disc 4 is mounted on an oblique axis 3 which bears on its other end a bevel gear cooperating with the gear pair 7. The axis 3 is supported by bearings 10 fastened to a vertical axis 8. The lower of said bearings 10 is provided with an axis 11 supporting the gear pair 7. The axis 8 is rotated within a stationary tube 12 bearing at its upper end a stationary gear 13 cooperating with one gear of the gear pair 7. When the axis 8 is rotated, it causes the system comprising the bearings 10, the gear pair 7 and the axis 3 with gear 9 and disc 4 to rotate around said vertical axis 8. Simultaneously the gear pair 7 is caused to rotate around its axis 11 by the interaction of gears 7 and 13. The upper gear of gear pair 7 causes gear 9 together with its axis 3 and the disc 4 to rotate. Generally speaking, the number of revolutions of the vertical axis 8 will be comparatively slow, for instance 50 revolutions per minute, while that of the oblique axis 3 will be high, as for example 1000 revolutions per minute. The aforedescribed means for rotating the disc 4 will hereinafter be referred to for the sake of simplicity of language, as "planetary gear device." By the said means, the disc sprays the shell of the cylinder in the form of an ellipse, the major diameter of which extends from the upper edge of the shell to the opposite lower edge. This ellipse revolves about the vertical axis or shaft and thus travels over the entire inner surface of the shell. Immediately on coming into contact with the disc, the liquid is atomized and projected against the heated walls of the still, where it forms an extremely thin layer and, consequently, evaporates almost instantaneously. The walls of the still may be suitably heated for example by electrical means, by steam or by combustion gases. The distilled gases and vapors issue continuously from the still at the upper end thereof through the pipe 5 and can be fractionally condensed, in the known manner, in serially arranged condensers. The undistilled constituents of the liquid, such as pitch, may be removed at the bottom of the still through the pipe 6, either continuously or from time to time. In this way, a continuous process of distillation is achieved, which, in the case of inflammable liquids, possesses the additional advantage in that only a very small fraction of the liquid, or distillation gases, is present in the danger zone of the heated still at any one time. A further advantage, which is particularly noticeable in the distillation of moisture-laden tars, is that, in consequence of the tenuity of the layer on the walls of the still, the whole of the tar fractions are vaporized at the same time as the contained water. Under these circumstances, the water content, which is otherwise so unfavorable to the distillation of the tar, proves advantageous inasmuch as the distillation process is thereby transformed into one of steam distillation, the great advantages of which consist in the lowering of the distillation temperature and a considerable degree of protection to the material under treatment.

The said advantages can also be obtained in the distillation of substances of a higher boiling point, which are liable to be decomposed during distillation and do not contain constituents of low boiling point, for example in the distillation of tars free from water, by adding liquids of low boiling point to the said substances before distillation. Suitable liquids of low boiling point are those, which are miscible or give emulsions with the substances to be distilled, such as for example water in the case of tar, or which give solutions with the said substances, such as for example alcohols, benzine or benzene and tar. Preferably such liquids are used which have as low a heat of vaporization as possible. The efficiency of the operation can easily be regulated by the amount of liquid of low boiling point added. It has been found that a considerable lowering of the distillation temperature and degree of protection to the material treated are already obtained by the addition of comparatively small amounts of liquids of low boiling point.

The process according to the present invention is of special advantage in the case of liquids which are particularly liable to decomposition by the action of heat. It is to be understood that the material under treatment may be allowed to evaporate in a longer or shorter time, according to its liability to decompose and to the amount of heat needed for its evaporation, by altering the speed of the vertical shaft. At the same time, the output capacity of the apparatus is very great by the fact that the entire surface of the cylinder shell is brought into contact with the liquid.

The operation may be conducted at ordinary pressure, or with diminished or increased pressure.

The following examples will further illustrate the nature of the said invention but the invention is not limited to the examples.

*Example 1*

630 litres of brown-coal tar containing about 22.5 per cent of water are distilled to expel everything but the pitch, in the one case in an ordinary copper still, and in the other in an apparatus according to the present invention, at ordinary pressure, the heating area being the same in both apparatus.

In the ordinary copper still, at a temperature of up to 360° C. in the still head, 142 litres (22.5 per cent) of water, 300 litres (47.6 per cent) of oil and 188 litres (29.9 per cent) of pitch, are obtained in 300 minutes.

According to the present process, however, with a temperature of up to 200° C. in the still head, 140 litres (22.2 per cent) of water, 360 litres (55.6 per cent) of oil, and 140 litres (22.2 per cent) of pitch are obtained in 30 minutes.

The great advantages resulting from the process according to the present invention namely much accelerated distillation, lower distillation temperature and reduced formation of pitch, are at once apparent.

*Example 2*

A mixture of 1 part by weight of a tar 50 per cent of which boiling above 350° C. and containing components, which are decomposed at the said temperature, and 1 part by weight of benzene is continuously vaporized without being decomposed in an apparatus as shown in the drawings, and the vapor mixture obtained is fractionally condensed. At a distillation temperature of about 250° C. a great part passes over without decomposition. The residue is a pitch of medium hardness free from all components boiling at temperatures up to 350° C. and from a great part of components boiling at still higher temperatures.

The great advantages of the manner of working, specifically consisting in the careful treatment of the distilled substances result from this example, according to which only 100 caloric units are used as heat of vaporization for each kilogram of benzene added.

When distilling substances still more liable to be decomposed the temperature of distillation can be lowered still further by working under diminished pressure or by introducing gases or vapors into the still which carry along the vapors.

The manner of working can be applied to the distillation, evaporation or drying of all decomposable or unstable substances such as for example tars, oils, coal, salts, foods and the like.

What we claim is:

1. Apparatus for volatilizing at least part of a difficultly distillable liquid, which comprises a still, means for heating the walls of said still, a disc mounted in said still and being rotatable around two axes forming an angle with each other, a planetary gear device for rotating said disc around said two axes, means for supplying the liquid to be distilled to the surface of said disc, and means for withdrawing vapors from said still.

2. Apparatus for volatilizing at least part of a difficultly distillable liquid, which comprises a vertical cylindrical still, means for heating the vertical walls of said still, a disc mounted in said still and being rotatable around two axes forming an angle with each other, a planetary gear device for rotating said disc around said two axes, means for supplying the liquid to be distilled to the surface of said disc, and means for withdrawing vapors from said still.

3. Apparatus for volatilizing at least part of a difficultly distillable liquid, which comprises a vertical cylindrical still, means for heating the vertical walls of said still, a disc mounted in said still and being rotatable around a vertical axis and around an oblique axis, a planetary gear device for rotating said disc around said two axes, means for supplying the liquid to be distilled to the surface of said disc, and means for withdrawing vapors from said still.

4. Apparatus for volatilizing at least part of a difficultly distillable liquid, which comprises a vertical cylindrical still, means for heating the vertical walls of said still, a disc mounted in said still and being rotatable around a vertical axis and around an oblique axis, a planetary gear device for rotating said disc around said two axes, at a low speed around said vertical axis and at a high speed around said oblique axis, means for supplying the liquid to be distilled to the surface of said disc, and means for withdrawing vapors from said still.

5. Apparatus for volatilizing at least part of a difficultly distillable liquid, which comprises a vertical cylindrical still, means for heating the vertical walls of said still, a disc mounted in said still and being rotatable around a vertical axis and around an oblique axis, a planetary gear device for rotating said disc around said two axes, at a low speed around said vertical axis and at a high speed around said oblique axis, said oblique axis forming a right angle with a line connecting the upper edge of the vertical wall of said still with the opposite lower edge, means for supplying the liquid to be distilled to the surface of said disc, and means for withdrawing vapors from said still.

6. Apparatus for volatilizing at least part of a difficultly distillable liquid, which comprises a still, means for heating the walls of said still, a disc mounted in said still and being rotatable around two axes forming an angle with each other, a planetary gear device for rotating said disc around said two axes, means for supplying the liquid to be distilled to the centre of said disc, and means for withdrawing vapors from said still.

7. Apparatus for volatilizing at least part of a difficultly distillable substance, which comprises a vertical cylindrical still, means for heating the vertical walls of said still, a disc mounted in said still and being rotatable around two axes forming an angle with each other, a planetary gear device for rotating said disc around said two axes, means for supplying the liquid to be distilled to the centre of said disc, and means for withdrawing vapors from said still.

8. Apparatus for volatilizing at least part of a difficultly distillable liquid, which comprises a vertical cylindrical still, means for heating the vertical walls of said still, a disc mounted in said still and being rotatable around a vertical axis and around an oblique axis, a planetary gear device for rotating said disc around said two axes, means for supplying the liquid to be distilled to the centre of said disc, and means for withdrawing vapors from said still.

9. Apparatus for volatilizing at least part of a difficultly distillable liquid, which comprises a vertical cylindrical still, means for heating the vertical walls of said still, a disc mounted in said still and being rotatable around a vertical axis and around an oblique axis, a planetary gear device for rotating said disc around said two axes, at a low speed around said vertical axis and at a high speed around said oblique axis, means for supplying the liquid to be distilled to the centre of said disc, and means for withdrawing vapors from said still.

10. Apparatus for volatilizing at least part of a difficultly distillable liquid, which comprises a vertical cylindrical still, means for heating the vertical walls of said still, a disc mounted in said still and being rotatable around a vertical axis and around an oblique axis, a planetary gear device for rotating said disc around said two axes, at a low speed around said vertical axis and at a high speed around said oblique axis, said oblique axis forming a right angle with a line connecting the upper edge of the vertical wall of said still with the opposite lower edge, means for supplying the liquid to be distilled to the centre of said disc, and means for withdrawing vapors from said still.

In testimony whereof we have hereunto set our hands.

HANS ADOLF von STADEN.
ALBERT BERENBRUCH.
ANTON HÖHN.